No. 831,253. PATENTED SEPT. 18, 1906.
F. THEIL.
COFFEE URN.
APPLICATION FILED MAY 6, 1905.

2 SHEETS—SHEET 1.

Witnesses:
Ray White.
Harry R. L. White.

Inventor
Fred Theil,
By Charles O. Hues Atty

No. 831,253. PATENTED SEPT. 18, 1906.
F. THEIL.
COFFEE URN.
APPLICATION FILED MAY 6, 1905.
2 SHEETS—SHEET 2.
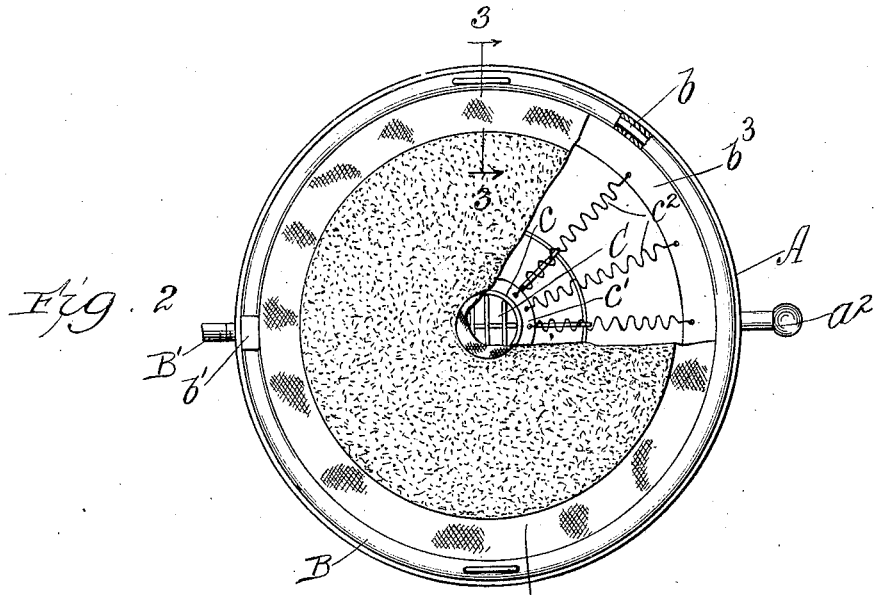
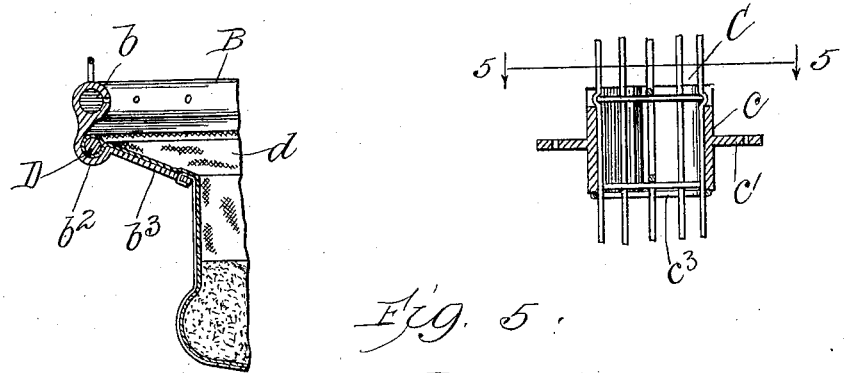
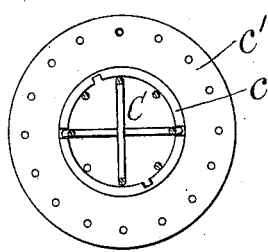
Witnesses:
Ray White.
Harry R. L. White.
Inventor:
Fred Theil.
By Charles Hill, Atty.

UNITED STATES PATENT OFFICE.

FRED THEIL, OF CHICAGO, ILLINOIS.

COFFEE-URN.

No. 831,253.   Specification of Letters Patent.   Patented Sept. 18, 1906.

Application filed May 6, 1905. Serial No. 259,104.

*To all whom it may concern:*

Be it known that I, FRED THEIL, a citizen of the United States, and a resident of Chicago, Cook county, Illinois, have invented certain new and useful Improvements in Coffee-Urns; and I do hereby declare that the following is a full, clear, and exact description of the same, reference being had to the accompanying drawings, and to the letters of reference marked thereon, which form a part of this specification.

In coffee-urns as heretofore constructed a bag or sack containing the ground or pulverized coffee has been suspended in the top of the urn, and usually from the construction and the means of supporting the bag the contents become compacted at the bottom and center of the bag in a relatively small space, thus preventing the hot water and steam from reaching all parts of the mass. In consequence the ground or pulverized coffee near the middle of the mass remains practically unaffected, thus wasting a large percentage of the coffee and affording a poorer beverage, deficient both in strength and aroma.

The object of this invention is to provide a coffee-urn affording within the same a central apertured support for the sack or bag containing the coffee. The coffee is thus spread over a relatively large area in a comparatively thin layer, thus exposing the coffee for approximately the entire cross-sectional area of the receptacle to the action of the water.

It is also an object of this invention to afford a resilient and nearly-horizontal support for the bottom of the bag and also to provide a central cage affording a support for the coffee-bag when removed from the urn and upon which the bottom of the bag at its middle is supported when in the urn and through which air, steam, or the infusion already drawn can circulate.

The invention embraces many novel features; and it consists in matters hereinafter described, and more fully pointed out and defined in the appended claims.

Figure 1:
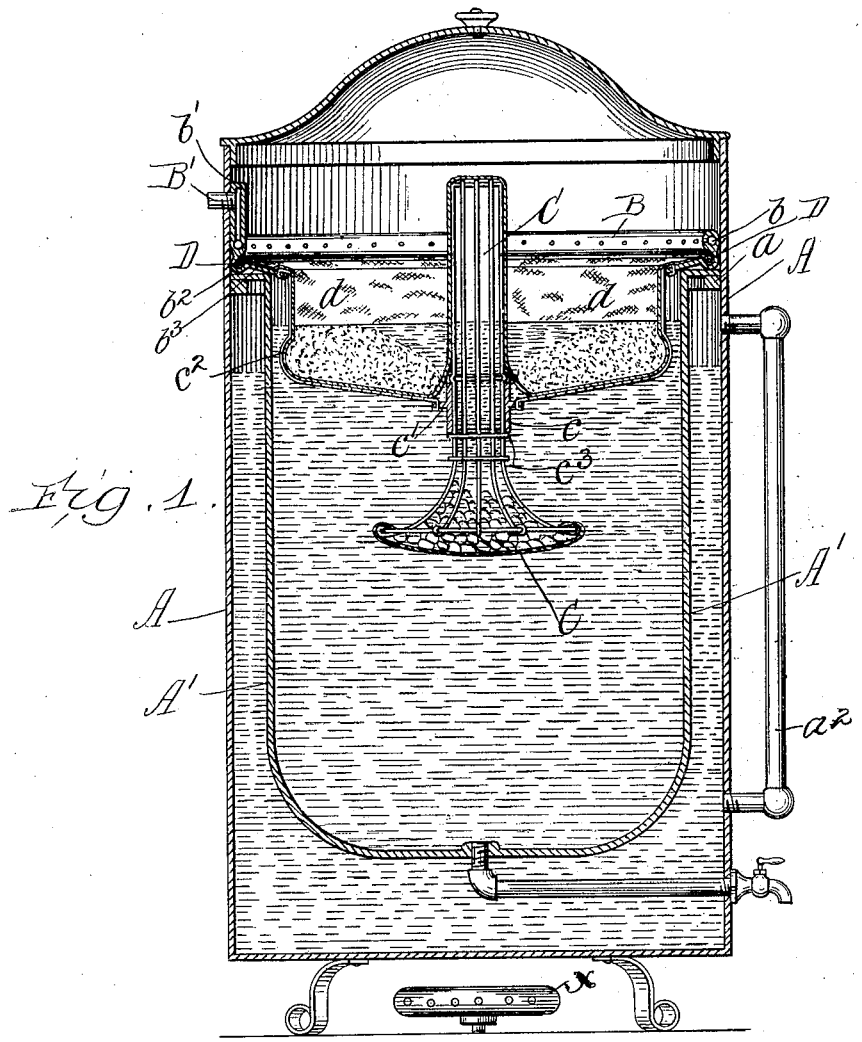
Figure 6:
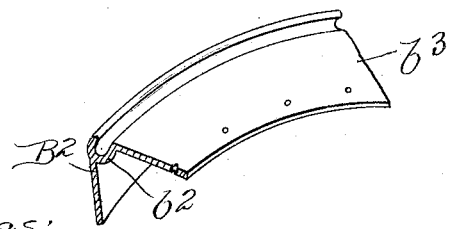

In the drawings, Figure 1 is a vertical central section of a device embodying my invention. Fig. 2 is a top plan view of the same with the cover removed. Fig. 3 is an enlarged section taken on line 3 3 of Fig. 2. Fig. 4 is an enlarged fragmentary vertical section of a part of the cage and support therefor. Fig. 5 is a section taken on line 5 5 of Fig. 4. Fig. 6 is a fragmentary modified view of a part of the supporting-ring.

As shown in the drawings, A indicates a covered can or receptacle adapted to contain hot water, steam, or other fluid at or above the boiling temperature for water in the usual manner and provided with a circumferential ring $a$ near its top on the inner side. A water-gage $a^2$ is provided for said receptacle in the usual manner, and heat may be supplied from a gas-burner $x$ or from the admission of live steam or in any suitable manner. An inner sheet-metal receptacle A', which contains the coffee or other infusion when drawn, is flanged at its top to engage on said ring and is thus jacketed by the fluid in the outer receptacle A. Supported on the top of the infusion-receptacle and said ring $a$ is a support comprising an annular carrying member B, of sheet or cast metal or other suitable material, of a size to fit removably within the outer or heating receptacle and upon the ledge afforded by the top of the inner receptacle A'. This, as shown, is provided at the top with a continuous water-channel $b$ therein, opening through a plurality of apertures on the inner side toward the center of the urn. As shown, also, an upwardly-projecting connection $b'$, which communicates with said water-channel, is provided with a slot, groove, or aperture therein, as shown in Fig. 1, adapted to receive the end of the hot-water-supply pipe B', which in the usual manner acts to admit water of the desired temperature into the urn. Below the water-channel said carrying member B is shaped to afford an annular concave seat $b^2$ to receive the ring D at the top of the fabric bag $d$. Below said seat a downwardly and inwardly inclined flange $b^3$ extends beyond the walls of the infusion-receptacle and is provided around its periphery with apertures arranged at approximately equal distances apart, as shown in Fig. 2. A cage C, constructed of any suitable material affording perforations therethrough, is secured to said flange $b^3$. As shown, the same is constructed of wire bent to afford an approximately cylindric frame at the upper end. At the lower end said cage diverges or flares outwardly, as shown in Fig. 1, affording a broad base. Said frame or cage, as shown, is fitted closely and removably within a ring $c$, provided with an integral external flange $c$, extending around the middle of the same and having apertures therein corresponding in number with the apertures in the flange $b^3$, with which it is connected by means of the wires $c^2$, which from said flange $b^3$ bend downwardly, then inwardly to said flange $c$, and which are bent laterally to afford resiliency, as shown in Fig. 2. Said cage is secured in said ring $c$ in any suitable manner. As shown, however, the ring is grooved longitudinally to receive the longitudinal wires, and the longitudinal wires of the cage are bent or kinked at a point below the middle of the same to engage in suitable notches arranged in the top of the ring, so that when the cage is forced upwardly therethrough the same is supported on the top of the ring and also by frictional engagement therein, and, as shown, also an encircling wire or band $c^3$ engages against the bottom of the ring.

Across the flaring bottom of the cage is stretched a fabric bag $d$, and in the receptacle thus formed can be placed egg-shells or any other material used in settling the infusion. The coffee-bag is of sufficient length to enable the same to extend at its middle over the top of the cage C, as shown in Fig. 1, and intermediate the cage and the flange $b^3$ to fit to the wires $c^2$, thus affording an annular relatively flat bottomed receptacle for the pulverized or ground coffee and having a diameter approximating the area of the top of the infusion-receptacle and which slopes gently inwardly toward the cage.

The operation is as follows: The sack $d$ having been partly filled with ground or pulverized coffee, as shown in Fig. 1, which is distributed over the bottom of the sack in a relatively thin layer, hot water admitted through the pipe B' is sprayed through the apertures from said water-channel upon the coffee and percolates therethrough into the infusion-receptacle below. The temperature in the infusion-receptacle is maintained by means of the water-jacket afforded by the outer receptacle A. As the infusion-receptacle gradually fills the air and steam passes upwardly through the cage and the bottom of the bag stretched over the same and meeting the inwardly-directed sprays from the water-channel any of the constituents of the coffee contained in the steam or vapor arising therethrough is again precipitated upon the coffee and percolated therethrough into the bottom of the receptacle. This operation continues until the coffee is drawn or until the hot water in the inner urn or receptacle rises approximately to or above the level of the coffee in the sack. When this occurs, the constant though gentle convection taking place in the infusion-receptacle continues the operation; thus insuring all particles of coffee receiving equal action of the hot water and the extraction of the entire strength of the material. Of course any suitable cover $A^2$ may be used on the urn, and a coffee-gage may be connected in the infusion-receptacle and also a suitable connection for drawing the coffee from said receptacle. The broad base of the cage serves as a support for the coffee-sack and annular carrying member when removed from the urn, and thus protects the sack and contents from contact with a table or other support for the same.

In coffee-urns in which the hot-water pipe B is not connected, as shown, to afford an inlet to a water-channel above the sack, but the water is otherwise introduced or sprayed directly upon the coffee, the annular member supporting the bag may be constructed without the waterway, as indicated by $B^2$, Fig. 6. Desirably, however, the said annular member is provided with a waterway, as before described, from which the water in its boiling temperature is sprayed upon the coffee.

I have shown but one construction embodying my invention, although the same may be constructed in various ways. I therefore do not purpose limiting this application for patent otherwise than as necessitated by the prior art, as obviously many details of construction may be varied and the urn may be employed for preparing infusions of any kind without departing from the principles of my invention.

I claim as my invention—

1. A device of the class described embracing an outer jacketing-receptacle, an infusion-receptacle, an annular support at the top of the infusion-receptacle, a central upwardly-directed apertured support, resilient connections between the annular support and the central support and a fabric sack adapted to contain the material to be treated disposed in a layer around the central support and means spraying water upon the contents of the sack.

2. In a device of the class described comprising an outer jacketing and an inner infusion receptacle an annular support at the top of the infusion-receptacle, a peripheral water-channel surrounding the same and having apertures on the inner side thereof, a cage supported on and extending above the annular support, a sack containing the material to be treated supported on said annular support and on the cage, said cage affording a central upward channel for the vapor from the infusion.

3. An urn of the class described comprising an outer receptacle adapted to contain hot water, a receptacle supported therein and jacketed thereby and adapted to contain the infusion, a hot-water inlet above the latter receptacle, an annular water-passage connecting with the inlet and surrounding the top of the infusion-receptacle and apertured to spray its contents thereinto, an axially-disposed cage, resilient connections with the annular passage spacing and supporting said cage in the receptacle and a bag or sack for the material to be treated supported partly on said cage.

4. The combination in a coffee-urn of a central supporting-ring, a plurality of radially and upwardly directed resilient members extending from said ring to the walls of the urn, a coffee percolator or sack supported thereon and a cylindric cage removably engaged in said ring and adapted to elevate the bottom of said sack above the coffee.

5. In a device of the class described the combination with an infusion-urn and a hot-water jacket therefor, of an annular water-channel at the top of said infusion-receptacle having apertures through which the water sprays upon the material to be treated, an axially-supported cage in said infusion-receptacle, a percolator-bag supported adjacent the water-channel and having a portion of its bottom supported over the cage whereby the contents of said percolator-bag is distributed around the cage in a relatively thin layer, and resilient supports beneath said material adapted to yieldingly support the same.

6. In a device of the class described the combination with an infusion-receptacle of an inwardly-directed apertured flange adjacent the top thereof, a central ring, a plurality of downwardly and inwardly directed resilient wires supporting said ring from said flange, an open cage removably engaged in said ring and extending upwardly above the flange and a coffee percolator or sack supported on said wires and cage.

7. In a device of the class described the combination with an inner and outer receptacle of a cage supported near the center of the inner receptacle, yielding connections between said cage and the side walls of the receptacle and a bag partly supported upon the receptacle and partly upon said cage and affording an annular resilient support for the material to be treated at approximately the top of the inner receptacle and means spraying hot water over said material.

8. In a device of the class described a percolator-bag, an annular supporting member therefor containing a water-passage having inwardly-opening apertures, a downwardly and inwardly directed flange having apertures in its inner periphery, resilient wires or rods connecting in the apertures of said flange and an apertured cage supported on the inner end of said wires.

9. In a coffee-urn the combination with a percolator-bag supported from the sides of the urn, of a wire cage supported in the urn above the bottom thereof and adapted to elevate the center of the bag above the material treated.

10. In a coffee-urn the combination with a percolator-bag of a removable annular support therefor containing means for spraying hot water thereinto of a centrally-supported cage extending above said support, and a receptacle at the bottom of the cage adapted to contain material to settle the infusion.

11. In an urn of the class described an outer receptacle, an inner receptacle supported therein, an inwardly-directed flange adjacent the top of said inner receptacle, a cylindric cage, resilient means supporting said cage intermediate its ends from said flange and a coffee percolator or sack supported near its margins on said resilient means and at its center on the upper end of said cage.

12. In a device of the class described the combination with a receptacle having a finely-perforated bottom, of a cylindric cage extending upwardly beneath said bottom and supporting the central portion thereof above the lateral portion and a plurality of resilient members extending from the cage beneath the receptacle.

13. In a device of the class described the combination with an infusion-receptacle of an annular supporting member above the same, an inwardly-directed apertured flange on said supporting member, resilient members engaged at their outer ends to said flange, a ring engaged on the inner ends of said resilient members, an upwardly-extended open cage therein and a sack supported on said resilient members and cage.

In testimony whereof I have hereunto subscribed my name in the presence of two subscribing witnesses.

FRED THEIL.

Witnesses:
C. W. HILLS,
W. W. WITHENBURY.